(12) United States Patent
Hwang

(10) Patent No.: US 6,278,886 B1
(45) Date of Patent: Aug. 21, 2001

(54) DEVICE AND METHOD FOR INPUTTING AND TRANSMITTING MESSAGES IN A PREDETERMINED SEQUENCE IN A PORTABLE TELEPHONE

(75) Inventor: Yong-Duk Hwang, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/121,810

(22) Filed: Jul. 22, 1998

(30) Foreign Application Priority Data

Jul. 25, 1997 (KR) ............................................. 1997-34913

(51) Int. Cl.[7] ...................................................... H04B 1/38
(52) U.S. Cl. .......................... 455/566; 455/466; 455/557; 455/558
(58) Field of Search ...................... 455/466, 425, 455/412, 414, 550, 566, 575, 557, 556, 558, 31.3; 340/825.44

(56) References Cited

U.S. PATENT DOCUMENTS

| 4,644,351 | * | 2/1987 | Zabarsky et al. | 340/825.44 |
| 4,728,936 | * | 3/1988 | Guscott et al. | 340/525 |
| 5,109,380 | * | 4/1992 | Ogino | 371/15.1 |
| 5,153,582 | * | 10/1992 | Davis | 340/825.44 |
| 5,351,235 | * | 9/1994 | Lahtinen | 370/58.1 |
| 5,581,599 | * | 12/1996 | Tsuji et al. | 379/63 |
| 5,796,397 | * | 8/1998 | Kusano | 345/339 |
| 5,812,953 | * | 9/1998 | Griffith et al. | 455/550 |
| 5,920,826 | * | 7/1999 | Metso et al. | 455/557 |
| 6,021,336 | * | 2/2000 | Kunihiro et al. | 455/575 |
| 6,055,439 | * | 4/2000 | Helin et al. | 455/550 |

FOREIGN PATENT DOCUMENTS

| 0 693 860 A2 | 1/1996 | (EP) | H04Q/7/32 |
| 0 755 126 A2 | 1/1997 | (EP) | H04B/1/38 |
| 0 801 512 A2 | 10/1997 | (EP) | H04Q/7/32 |

* cited by examiner

Primary Examiner—Dwayne Bost
Assistant Examiner—Joy K. Contee
(74) Attorney, Agent, or Firm—Dilworth & Barrese, LLP

(57) ABSTRACT

A device and method for inputting messages in a predetermined sequence and then transmitting input messages at a specific time. When a scenario mode is selected, a plurality of input modes are displayed in predetermined sequence. A next input mode is displayed, when a current input mode is completed by either skipping it or receiving a message input according to the current input mode. Then, the messages input up to the present are transmitted when the message input is completed for all the input modes in the predetermined sequence. The scenario mode includes "when", "where", "who", "what", "how", "why" and "the rest" input modes, and the input modes are selected in the sequence of "when", "where", "who", "what", "how", "why" and "the rest".

15 Claims, 2 Drawing Sheets

DEVICE AND METHOD FOR INPUTTING AND TRANSMITTING MESSAGES IN A PREDETERMINED SEQUENCE IN A PORTABLE TELEPHONE

BACKGROUND OF THE INVENTION

1. Field of the Invention

The present invention relates to portable telephones, and more particularly, to a device and method for transmitting messages in a portable telephone.

2. Description of the Related Art

In general, a portable telephone, e.g., GSM (Global System for Mobile Communications) phone, employs a short message service (SMS) in which the user inputs messages to be transmitted and after completion of the message input, the portable telephone transmits the input messages.

However, it takes a long time for the conventional message transmission method to transmit the messages, since the messages are transmitted after the user finishes inputting all the messages (or characters). Furthermore, in the conventional portable telephone, the messages do not have a set form, which may cause a change in the meaning during transmission of the messages.

SUMMARY OF THE INVENTION

Accordingly, it is an object of the present invention to provide a method for inputting messages according to a predetermined scenario mode and then, transmitting the input messages.

It is another object of the present invention to provide a method for inputting messages according to set modes and then, transmitting the input messages.

It is still another object of the present invention to provide a method for inputting messages in a predetermined sequence and then, transmitting the input messages.

To achieve the above objects, the present invention provides a device and method for inputting messages in a predetermined sequence and then transmitting the input messages. In the method, a plurality of input modes are displayed in predetermined sequence, if a scenario mode is selected. A next input mode is displayed, if a current input mode is skipped or a message input according to the current input mode is completed. Then, the messages input up to the present are transmitted at a time, if the message input is completed for all the input modes in predetermined sequence.

Preferably, the scenario mode includes grammatical interrogatives such as "when", "where", "who", "what", "how", "why" and "the rest" input modes, and the input modes are selected in sequence of the "when", "where", "who", "what", "how", "why" and "the rest" input modes.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1:
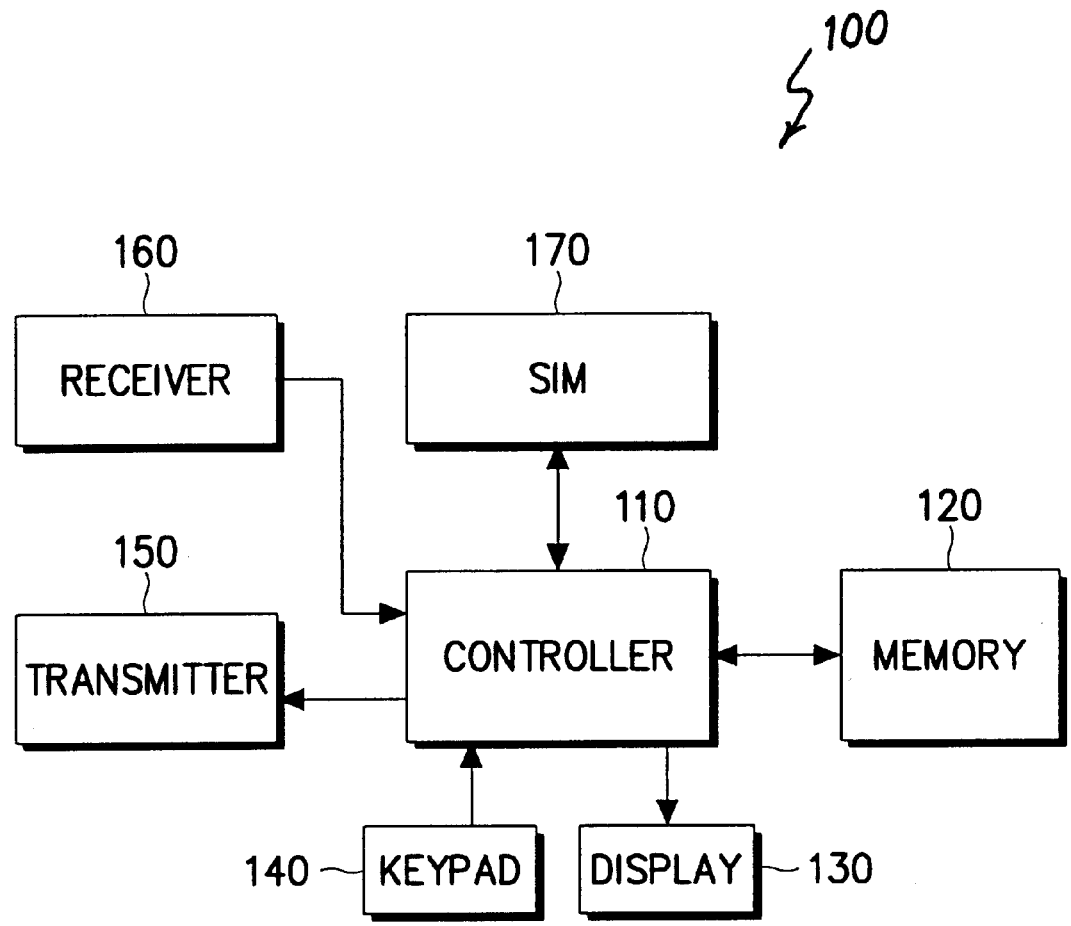
FIG. 1 is a schematic block diagram of a portable telephone to which the present invention is applicable.

FIG. 1 is a block diagram of the portable telephone 100 to which the present invention is applicable. As illustrated, the portable telephone includes a controller 110, a memory 120, a display 130, a keypad 140, a transmitter 150, a receiver 160 and a SIM (Subscriber Identity Module) 170.

Figure 2:
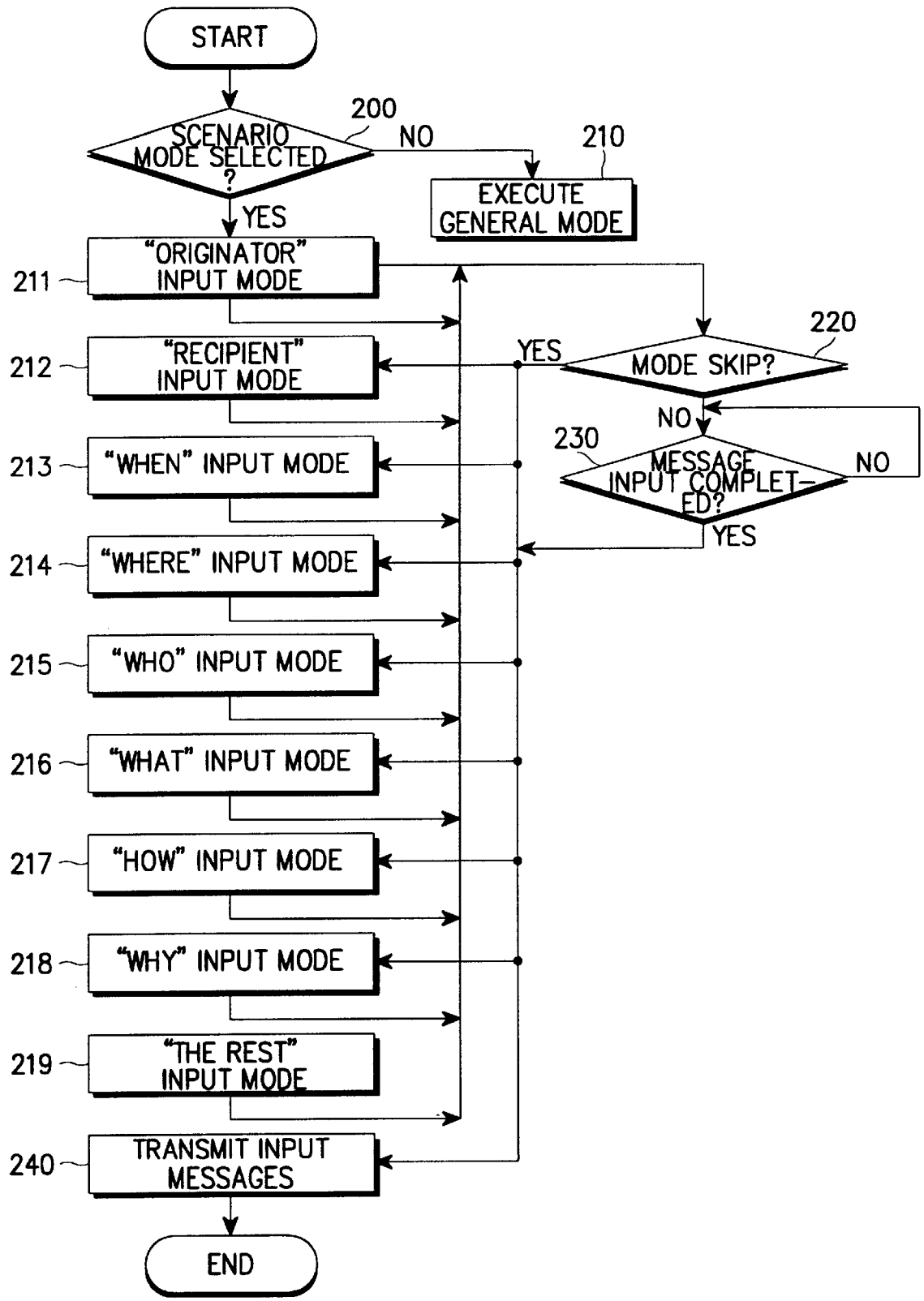
FIG. 2 is a flow chart for inputting messages in predetermined sequence and then, transmitting the input messages according to an embodiment of the present invention.

FIG. 2 is a flow chart for inputting messages in a predetermined sequence and then transmitting the input messages in the portable telephone of FIG. 1, according to an embodiment of the present invention, wherein the messages are input according to various grammatical interrogatives, such as those defined by a 5-WH and 1-H (when, where, who, what, how, why) rule.

Now, referring to FIGS. 1 and 2, a detailed description will be given how the portable telephone inputs messages in a predetermined sequence and then, transmits the input messages. In step 200 of FIG. 2, the controller 110 searches key data input from the keypad 140 to determine if a scenario mode according to the present invention is selected. If the scenario mode is not selected, the controller 110 executes a control operation according to a general input mode (step 210). Here, the general input mode refers to an input mode where the user inputs the characters at random. On the contrary, if the scenario mode of the present invention is selected, the controller 110 accesses memory 120 where the scenario mode and corresponding input message steps are stored, and outputs to the display 130 a message informing the entry into an "originator (or originating party)" input mode (step 211). In step 220, the controller 110 receives the key data input from the keypad 140 to determine whether to skip the "originator" input mode. If the "originator" input mode is not skipped, the controller 110 checks if the message input according to the "originator" input mode is completed (step 230) by using the key data input from the keypad 140.

When the "originator" input mode is skipped or the message input according to the "originator" input mode is completed, the controller 110 outputs a message informing the entry into a following "recipient (or terminating party)" input mode according to the scenario mode to the display 130 (step 212). In step 220, the controller 110 received the input key data from keypad 140 to determine whether or not to skip the "recipient" input mode. If the "recipient" input mode is not skipped, the controller 110 checks if the message input according to the "recipient" input mode is completed by using the key data input from the keypad 140 (step 230).

After the "recipient" input mode is skipped or the message input according to the "recipient" input mode is completed, the controller 110 outputs a message informing the entry into a following "when" input mode according to the scenario mode to the display 130 (step 213). In step 220, the controller 110 determines whether or not to skip the "when" input mode upon receiving the input key data from the keypad 140. If the "when" input mode is not skipped, the controller 110 checks if the message input according to the "when" input mode is completed by using the key data input from the keypad 140 (step 230).

After the "when" input mode is skipped or the message input according to the "when" input mode is completed, the controller 110 outputs a message informing the entry into a following "where" input mode according to the scenario mode to the display 130 (step 214). In step 220, the controller 110 determines whether or not to skip the "where" input mode upon receiving input key data from the keypad 140. If the "where" input mode is not skipped, the controller 110 checks if the message input according to the "where" input mode is completed by using the key data input from the keypad 140 (step 230).

When the "where" input mode is skipped or the message input according to the "where" input mode is completed, the controller 110 outputs a message informing the entry into a following "who" input mode according to the scenario mode to the display 130 (step 215). In step 220, the controller 110 determines whether or not to skip the "who" input mode upon receiving input key data from the keypad 140. If the "who" input mode is not skipped, the controller 110 checks if the message input according to the "who" input mode is completed by using the key data input from the keypad 140 (step 230).

After the "who" input mode is skipped or the message input according to the "who" input mode is completed, the controller 110 outputs a message informing the entry into a following "what" input mode according to the scenario mode to the display 130 (step 216). In step 220, the controller 110 determines whether or not to skip the "what" input mode upon receiving input key data from the keypad 140. If the "what" input mode is not skipped, the controller 110 checks if the message input according to the "what" input mode is completed by using the key data input from the keypad 140 (step 230).

After the "what" input mode is skipped or the message input according to the "what" input mode is completed, the controller 110 outputs a message informing the entry into a following "how" input mode according to the scenario mode to the display 130 (step 217). In step 220, the controller 110 determines whether or not to skip the "how" input mode upon receiving input key data from the keypad 140. If the "how" input mode is not skipped, the controller 110 checks if the message input according to the "how" input mode is completed by using the key data input from the keypad 140 (step 230).

When the "how" input mode is skipped or the message input according to the "how" input mode is completed, the controller 110 outputs a message informing the entry into a following "why" input mode according to the scenario mode to the display 130 (step 218). In step 220, the controller 110 determines whether or not to skip the "why" input mode upon receiving input key data from the keypad 140. If the "why" input mode is not skipped, the controller 110 checks if the message input according to the "why" input mode is completed by using the key data input from the keypad 140 (step 230).

When the "why" input mode is skipped or the message input according to the "why" input mode is completed, the controller 110 outputs a message informing the entry into a following "the rest" input mode according to the scenario mode to the display 130 (step 219). In step 220, the controller 110 determines whether or not to skip the "the rest" input mode upon receiving input key data from the keypad 140. If the "the rest" input mode is not skipped, the controller 110 checks if the message input according to the "the rest" input mode is completed by using the key data input from the keypad 140 (step 230).

After the "the rest" input mode is skipped or the message input according to the "the rest" input mode is completed, the controller 110 transmits the messages which have been input according to the scenario mode of the present invention in step 240.

As described above, the portable telephone of the present invention inputs messages to be transmitted in a predetermined sequence, enabling a clear message transmission.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method for transmitting messages in a portable telephone, comprising the steps of:

displaying a plurality of input modes in a predetermined sequence, when a scenario mode is selected;

displaying a next input mode, when a current input mode is skipped or a message input according to the current input mode is completed, wherein said predetermined sequence is a sequence of grammatical interrogatives; and transmitting the input messages when the message input is completed for all the input modes in said predetermined sequence;

wherein said scenario mode comprises "when", "where", "who", "what", "how" and "the rest" input modes, wherein said input modes are selected in sequence of the "when", "where", "who", "what", "how", "why" and "the rest" input modes.

2. A method for transmitting messages in a portable telephone, comprising the steps of:

entering an "originator" input mode when a scenario mode is selected, and skipping the "originator" input mode or receiving a message input according to the "originator" input mode in response to a key input by a user;

entering a "recipient" input mode, and skipping the "recipient" input mode or receiving a message input according to the "recipient" input mode in response to the key input by the user;

entering a "when" input mode, and skipping the "when" input mode or receiving a message input according to the "when" input mode in response to the key input by the user;

entering a "where" input mode, and skipping the "where" input mode or receiving a message input according to the "where" input mode in response to the key input by the user;

entering a "who" input mode, and skipping the "who" input mode or receiving a message input according to the "who" input mode in response to the key input by the user;

entering a "what" input mode, and skipping the "what" input mode or receiving a message input according to the "what" input mode in response to the key input by the user;

entering a "how" input mode, and skipping the "how" input mode or receiving a message input according to the "how" input mode in response to the key input by the user;

entering a "why" input mode, and skipping the "why" input mode or receiving a message input according to the "why" input mode in response to the key input by the user;

entering a "the rest" input mode, and skipping the "the rest" input mode or receiving a message input according to the "the rest" input mode in response to the key input by the user; and transmitting the messages input up to the present, when the message input is completed for all the input modes.

3. The method as claimed in claim 2, wherein said step of entering a "recipient" input mode is performed when the "originator" input mode is completed by either skipping or receiving message input.

4. The method as claimed in claim 2, wherein said step of entering a "when" input mode is performed when the "recipient" input mode is completed by either skipping or receiving message input.

5. The method as claimed in claim 2, wherein said step of entering a "where" input mode is performed when the "when" input mode is completed by either skipping or receiving message input.

6. The method as claimed in claim 2, wherein said step of entering a "who" input mode is performed when the "where" input mode is completed by either skipping or receiving message input.

7. The method as claimed in claim 2, wherein said step of entering a "what" input mode is performed when the "who" input mode is completed by either skipping or receiving message input.

8. The method as claimed in claim 2, wherein said step of entering a "how" input mode is performed when the "what" input mode is completed by either skipping or receiving message input.

9. The method as claimed in claim 2, wherein said step of entering a "why" input mode is performed when the "how" input mode is completed by either skipping or receiving message input.

10. The method as claimed in claim 2, wherein said step of entering a "the rest" input mode is performed when the "why" input mode is completed by either skipping or receiving message input.

11. A method for transmitting messages in a portable telephone, comprising the steps of:

entering an "originator" input mode when a scenario mode is selected, and skipping the "originator" input mode or receiving a message input according to the "originator" input mode in response to a key input by a user;

entering a "recipient" input mode, and skipping the "recipient" input mode or receiving a message input according to the "recipient" input mode in response to the key input by the user, when the "originator" input mode is completed by skipping or receiving the message input;

entering a "when" input mode, and skipping the "when" input mode or receiving a message input according to the "when" input mode in response to the key input by the user, when the "recipient" input mode is completed by skipping or receiving the message input;

entering a "where" input mode, and skipping the "where" input mode or receiving a message input according to the "where" input mode in response to the key input by the user, when the "when" input mode is completed by skipping or receiving the message input;

entering a "who" input mode, and skipping the "who" input mode or receiving a message input according to the "who" input mode in response to the key input by the user, when the "where" input mode is completed by skipping or receiving the message input;

entering a "what" input mode, and skipping the "what" input mode or receiving a message input according to the "what" input mode in response to the key input by the user, when the "who" input mode is completed by skipping or receiving the message input;

entering a "how" input mode, and skipping the "how" input mode or receiving a message input according to the "how" input mode in response to the key input by the user, when the "what" input mode is completed by skipping or receiving the message input;

entering a "why" input mode, and skipping the "why" input mode or receiving a message input according to the "why" input mode in response to the key input by the user, when the "how" input mode is completed by skipping or receiving the message input;

entering a "the rest" input mode, and skipping the "the rest" input mode or receiving a message input according to the "the rest" input mode in response to the key input by the user, when the "why" input mode is completed by skipping or receiving the message input; and transmitting the messages input up to the present, when the message input is completed for all the input modes.

12. A portable telephone having a receiver, transmitter, a subscriber identity module, a keypad having a plurality of keys for receiving user input, and a display for displaying the user input and providing messages to the user, the portable telephone comprising:

a controller connected to the keypad, display, receiver, transmitter, and subscriber identity module for controlling the operation of the portable telephone; and a memory coupled to said controller for storing as least one scenario mode, said at least one scenario mode enabling input and transmission of messages in a predetermined sequence, wherein said predetermined sequence is a sequence of grammatical interrogatives;

wherein said scenario mode comprises "when", "where", "who", "what", "how" and "the rest" input modes, wherein said input modes are selected in sequence of the "when", "where", "who", "what", "how", "why" and "the rest" input modes.

13. The portable telephone as claimed in claim 12, wherein said controller accesses said at least one scenario mode in response to a user input via said keypad.

14. The portable telephone as claimed in claim 12, wherein said at least one scenario mode causes said controller to prompt the user, via said display, to input messages in a predetermined sequence.

15. The portable telephone as claimed in claim 14, wherein said memory stores the input messages in the predetermined sequence, said transmission being performed after said predetermined sequence of input messages is complete.

* * * * *